United States Patent [19]

Bremner, III

[11] Patent Number: 5,369,738

[45] Date of Patent: Nov. 29, 1994

[54] DISTRIBUTED PROCESSING APPARATUS AND METHOD FOR USE IN GLOBAL RENDERING

[75] Inventor: David F. Bremner, III, Fort Collins, Colo.

[73] Assignee: Hewlett-Packard Company, Palo Alto, Calif.

[21] Appl. No.: 197,224

[22] Filed: Feb. 16, 1994

Related U.S. Application Data

[63] Continuation of Ser. No. 37,489, Mar. 26, 1993, abandoned, which is a continuation of Ser. No. 468,677, Jan. 23, 1990, abandoned.

[51] Int. Cl.⁵ ............................................. G06F 15/72
[52] U.S. Cl. .................................. 395/126; 395/163; 395/800; 395/121
[58] Field of Search ............... 395/126, 163, 127, 121, 395/120, 124, 800

[56] References Cited

U.S. PATENT DOCUMENTS

| | | | |
|---|---|---|---|
| 4,649,498 | 3/1987 | Kedem et al. | 395/120 |
| 4,730,261 | 3/1988 | Smith | 395/126 X |
| 4,737,921 | 4/1988 | Goldwasser et al. | 395/126 X |
| 4,866,637 | 9/1989 | Gonzalez-Lopez et al. | 395/126 |
| 4,928,250 | 5/1990 | Greenberg et al. | 395/126 |
| 4,958,303 | 9/1990 | Assarpour et al. | 395/163 |
| 5,010,515 | 4/1991 | Torborg, Jr. | 395/163 |
| 5,043,922 | 8/1991 | Matsumoto | 395/126 X |
| 5,058,042 | 10/1991 | Hanna et al. | 395/127 |

OTHER PUBLICATIONS

"Essential Ray Tracing Algorithms", Haines, Eric, *3D/Eye, Inc.*, Second Edition, pp. 1–41, May, 1988.

"Ray Tracing Complex Scenes", Kay, Timothy L., and Kajiya, James T., *SIGGRAPH '86, California Institute of Technology*, vol. 20, Nov. 4, 1986, pp. 269-277.

"The Hemi-Cube: A Radiosity Solution For Complex Environments", Cohen, Michael F., Greenberg, Donald F., *SIGGRAPH '85 Cornell University*, vol. 4, Nov. 4, 1985, pp. 31-40.

"A Ray Tracing Algorithm For Progressive Radiosity", Wallace, John R., Elmquist, Kells A. and Haines, Eric A., *Computer Graphics*, vol. 23, No. 3, Jul., 1989, pp.315-324.

"The Pixel Machine: A Parallel Image Computer", Potmesil, M. and Hoffert, E. M., *Computer Graphics*, vol. 23, No. 3, Jul., 1989, pp. 69-78.

"High-Performance Polygon Rendering", Akeley, K. and Jermoluk, T., *Computer Graphics*, vol. 22, No. 4, Aug., 1988, pp. 239∝246.

"Hardware Acceleration for Window Systems", Rhoden, D. and Wilcox, C., *Computer Graphics*, vol. 23, No. 3, Jul. 1989, pp. 61-67.

"Radiosity: A Method For Computing Global Illumination", Greenberg, Donald P., Cohen, Michael F., and Torrance, K., *The Visual Computer*, vol. 2, pp. 291-297 (1986).

Forgue, M., "Generation d'Images Par Lance De Rayons Sur Un Calculateur Parallele", Gretsi, Onzieme Colloque Sur Le Traitment Du Signal et Des Images, pp. 653-656 (1 Jun. 1987).

Murakami, K., Hirota, K. and Ishii, M., "Fast Ray Tracing", Fujitsu Scientific & Technical Journal, pp. 150-159, vol. 24, No. 2, (Summer 1988).

Deguchi, H., Omura, K., and Shirakawa, I., "A Parallel Processing Scheme for Tree–Structured Image Generation System" 1988 IEEE International Symposium on Circuits and Systems, pp. 569-572, (Jun. 7-9, 1988).

European Search Report, EPO Application No. 91 30 0212, (Jun. 28, 1993).

*Primary Examiner*—Raymond J. Bayerl

[57] ABSTRACT

A method and apparatus for use in a three dimensional computer graphics renderer employing global illumination distributes ray intersection calculations over a plurality of transform processors to accelerate the intersection testing process. Results are stored to a shared memory and subsequently retrieved by a host computer for global rendering.

25 Claims, 6 Drawing Sheets

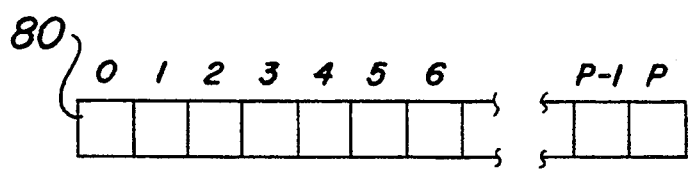
| PROCESSOR NO. | REGISTER CONTENTS |
|---|---|
| 1 | 1000···00 |
| 2 | 0100···00 |
| 3 | 0010···00 |
| 4 | 0001···00 |
| ⋮ | ⋮ |
| P-1 | 0000 10 |
| P | 0000 01 |
FIG. 4
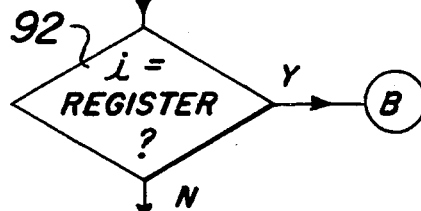
FIG. 5
- COMPLETION REGISTER
- RUNNING TOTAL INTERSECTIONS
- TOTAL WORDS
- TOTAL INTERSECTIONS
- INTERSECTION RESULTS
FIG. 6

DISTRIBUTED PROCESSING APPARATUS AND METHOD FOR USE IN GLOBAL RENDERING

This is a continuation of copending application Ser. No. 08/037,489 filed on Mar. 26, 1993, now abandoned, which is a continuation of application Ser. No. 07/468,677, filed Jan. 23, 1990, also abandoned.

FIELD OF THE INVENTION

The present invention relates generally to the area of three dimensional computer graphics. More particularly, the present invention relates to a method and apparatus for accelerating ray intersection calculations in a three dimensional graphics renderer employing a global illumination technique, such as radiosity or ray tracing.

BACKGROUND OF THE INVENTION

A number of global illumination techniques for generating three dimensional computer graphics are known, the most common of which are ray tracing and radiosity. Both ray tracing and radiosity compute the global illumination of a scene by testing for intersections between (i) surface elements ("polygons") and/or boxes ("bounding volumes") derived from objects to be rendered in the scene, and (ii) rays cast from either viewpoints of the scene (ray tracing) or light sources in the scene (radiosity). These steps are sometimes referred to as polygon testing, box testing and/or shadow testing. The following publications which are incorporated herein by reference are descriptive of ray tracing and radiosity techniques for solving global illumination of a scene: *An Introduction to Ray Tracing*, Ed. by Andrew S. Glassnet, Academic Press, 1989 (chapter 2, pp. 33-77); Kay, T. L. et al., "Ray Tracing Complex Scenes," *SIGGRAPH Proceedings*, vol. 20, no. 4, pp. 269-277 (August, 1986); Greenberg, D. P. et al., "Radiosity: A Method For Computing Global Illumination," *The Visual Computer*, vol. 2, pp. 291-297 (1986); Cohen, M. F. et al., "The Hemi-Cube: A Radiosity Solution For Complex Environments," *SIGGRAPH Proceedings*, vol. 19, no. 3, pp. 31-40 (1985). One presently preferred method of solving the global illumination of the scene, and in which the present invention has particular application, is described in co-pending U.S. application Ser. No. 332,777 filed Apr. 3, 1989, now U.S. Pat. No. 5,313,568, and entitled, "Three Dimensional Computer Graphics Employing Ray Tracing to Compute Form Factors in Radiosity." See also, Wallace, J. R. et al., "A Ray Tracing Algorithm for Progressive Radiosity," *SIGGRAPH Proceedings*, Computer Graphics, vol. 23, no. 3, pp. 315-324 (July, 1989).

Typically, data defining the scene to be rendered, including a description of objects and light sources in the scene, are provided in a database upon which the global renderer operates (e.g., by ray tracing or radiosity) to compute global illumination, and generally all of the computations, including the ray intersection calculation, are carried out in a host computer. One of the problems with prior art global renderers, however, is that the ray intersecting calculations are extremely time consuming; most of the time spent solving global illumination is performed on the ray intersection calculations. The following publications generally discuss hardware and software systems for accelerating the global illumination solution: Potmesil, M. et al., "The Pixel Machine: A Parallel Image Computer," *SIGGRAPH Proceedings*, vol. 23, no. 3, pp. 69-78 (July, 1989); Akeley K. et al., "High-Performance Polygon Rendering," *SIGGRAPH Proceedings*, vol. 22, no. 4, pp. 239-246 (August, 1988). These systems, however, do not adequately address the need for accelerating ray intersection calculation in global rendering.

It is desirable to provide a method and apparatus that may be employed with either ray tracing or radiosity (or any other global illumination technique that relies upon ray intersections) for accelerating the ray intersection calculations, but is simple, efficient and relatively inexpensive to implement. The present invention achieves these goals.

SUMMARY OF THE INVENTION

A host computer includes a database for storing data defining a scene to be rendered on a display, including data indicative of bounding volumes and polygons derived from objects to be rendered in the scene. According to the invention, there is provided a transform engine comprising a plurality P of transform processors, each of which is programmed to perform ray intersection calculations on selected bounding volume and polygon data provided by the host. The ray intersection calculations for all of the bounding volume and polygon data stored in the host are distributed over the P transform processors.

A shared memory is operatively coupled to communicate with both the transform engine and the host, and each transform processor is programmed to store the results of its ray intersection calculations in the shared memory for retrieval by the host. According to one embodiment of the invention, a block data transfer path is provided between the host and the transform engine for rapidly transferring the bounding volume and polygon data from the host to the transform engine. The block data transfer path may comprise a DPLA (direct memory access) circuit. In accordance with another embodiment of the invention, the transform engine includes a plurality of dedicated memories, with one dedicated memory being associated with each transform processor. In accordance with this embodiment, data from the host is stored directly into the dedicated memories in DMA cycles for operation thereupon by each transform processor.

In yet another embodiment, the bounding volume and polygon data are stored as datawords in sequential memory locations of each dedicated memory, and each transform processor is programmed to perform ray intersection calculations on every Pth dataword in its associated dedicated memory (where P is the number of transform processors). Each transform processor starts with a different dataword than all other transform processors so that the transform processors collectively perform the ray intersection calculations on all of the datawords. The ray intersection calculations are thereafter stored in the shared memory for retrieval by the host.

In a preferred method of carrying out the invention, the following steps are performed:
 (a) storing graphics data, including bounding volume and polygon data, in a host;
 (b) transmitting, via block data transfers, the bounding volume and polygon data from the host to a transform engine of a type comprising a plurality P of transform processors and associated dedicated memories and storing the data as datawords in sequential locations of the dedicated memories;

(c) distributing ray intersection calculations to be performed on the bounding volume and polygon data over the P transform processors by performing ray intersection calculations on every Pth dataword in each associated dedicated memory with each transform processor starting with a different dataword than other transform processors;

(d) storing the results of the ray intersection calculations in a shared memory; and, (e) transmitting the ray intersection results stored in shared memory to the host for global rendering after a last of the transform processors has completed performing ray intersection calculations.

Further details of the invention will become evident from a reading of the following specification and claims.

BRIEF DESCRIPTION OF THE DRAWINGS

FIG. 4 illustrates the concept of an information register as provided in accordance with the practice of a preferred embodiment of the invention.

FIG. 5 is a flowchart illustrating further details of the method of the present invention.

FIG. 6 illustrates a preferred organization of shared memory in accordance with the practice of the present invention.

DETAILED DESCRIPTION OF THE INVENTION

Figure 1:
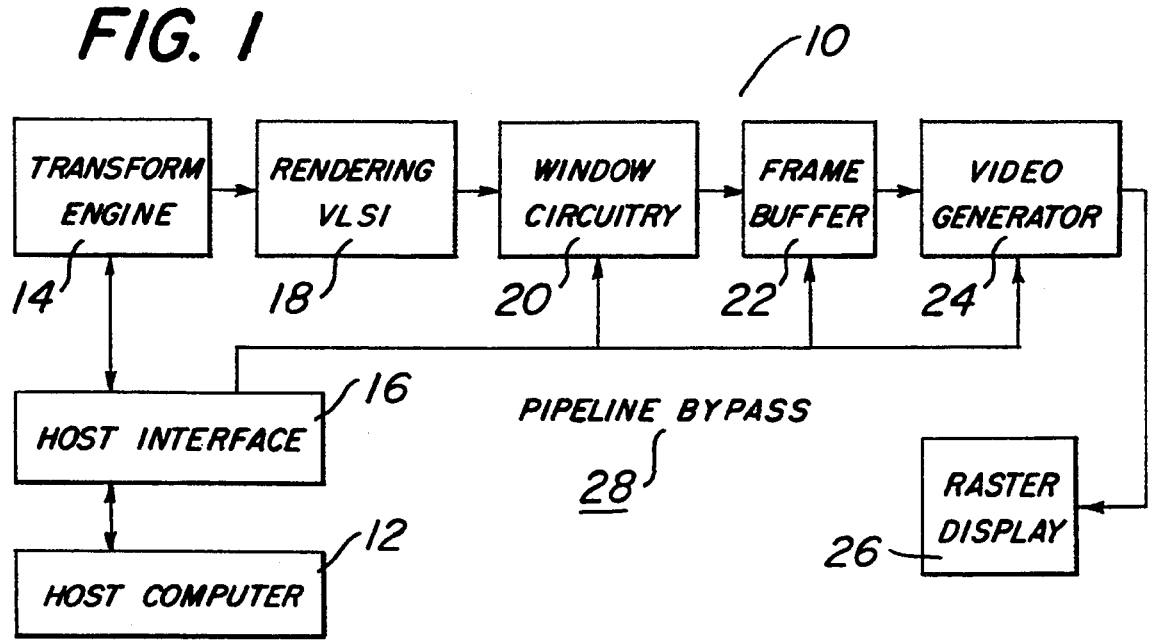
FIG. 1 is a block diagram of a computer graphics renderer in which the apparatus and method of a present invention may be employed.

Referring to the drawings, wherein like numerals represent like elements, there is illustrated in FIG. 1 a block diagram of a computer graphics renderer 10 in which the apparatus and method of present invention may be employed. It should be understood, however, that the present invention is not limited to graphics renderers of the type illustrated in FIG. 1. Rather, the invention may be employed in connection with any graphics renderer employing a global illumination technique such as ray tracing or radiosity.

The details of the graphics renderer 10 are more fully described in co-pending patent application Ser. No. 387,510, now U.S. Pat. No. 5,224,210, entitled, "Methods and Apparatus For Accelerating Windows in Graphics Systems." See also, Rhoden, D. et al., "Hardware Acceleration For Window Systems," *SIGGRAPH Proceedings*, Computer Graphics, vol. 23, no. 3, pp. 61–67 (July, 1989). Except as set forth in the appended claims, the details of the graphics renderer 10 do not form a part of the present invention, and thus will not be described in detail herein. Rather, reference should be made to the aforementioned documents. Suffice it to say that the graphics renderer 10 of FIG. 1 comprises a host computer 12 communicating with a transform engine 14 via an interface 16. The transform engine 14 communicates graphics data to a rendering VLSI (very large scale integrated circuit) 18, which in turn communicates with window circuitry 20. Window circuitry 20 provides data to a frame buffer 22 which in turn communicates with a video generator 24. The video generator 24 controls the display of images on a raster display 26. Data is also communicated from the host computer 12 to window circuitry 20, frame buffer 22 and video generator 24 via interface circuit 16 and a pipeline bypass 28. If a graphics renderer of the type of FIG. 1 is employed, the apparatus and method of the present invention is preferably incorporated into the host computer 12, interface 16 and transform engine 14 as described in detail herein.

Figure 2:
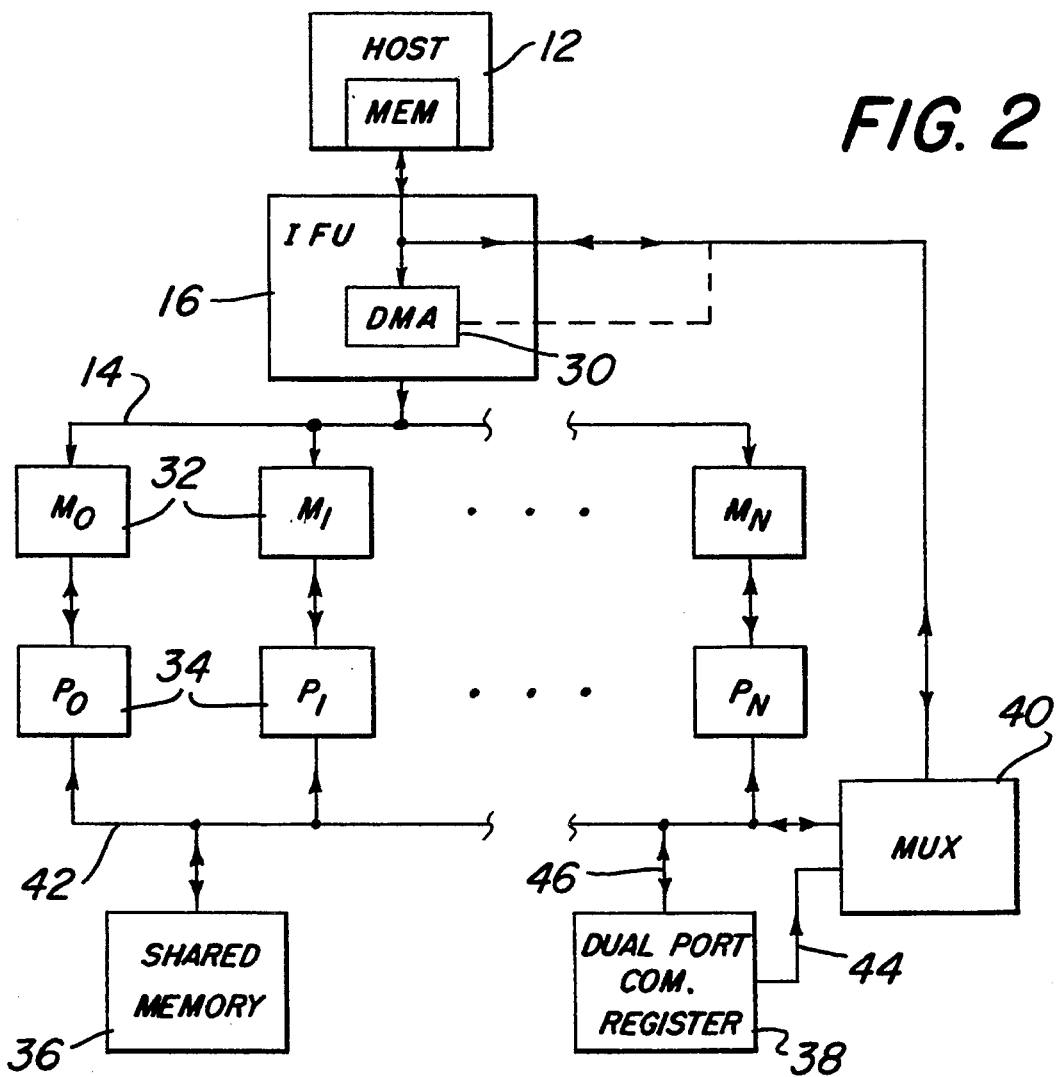
FIG. 2 is a block diagram of an apparatus embodying the principles of present invention.

Turning now to FIG. 2, there is illustrated a block diagram of an apparatus embodying the principles of the present invention. As illustrated, the host computer 12 communicates with the transform engine 14 by means of an interface (IFU) 16, as in FIG. 1. However, the interface 16 is provided with a block data transfer circuit, which in the preferred embodiment is a DMA circuit 30. Additionally, unlike the diagram of FIG. 1, the transform engine 14 comprises a plurality P of transform processors 34 and associated dedicated memories 32 which will be described in more detail hereinafter.

Data defining the scene, including data indicative of bounding volumes and polygons derived from objects to be rendered in the scene, and data defining rays to be intersected with the bounding volumes and polygons, are stored in the memory of the host computer 12. The bounding volume and polygon data, and the ray description data, are rapidly transferred to each of the dedicated memories 32 in block data transfers (preferably DMA cycles) as will be described in greater detail hereinafter. Thus, after the host downloads data, each dedicated memory 32 will contain the same bounding volume and polygon data and ray description data. Preferably, the bounding volume and polygon data are stored as datawords in sequential memory locations of each dedicated memory 32. As will also become evident hereinafter, each transform processor is programmed to perform ray intersection calculations on only selected bounding volume and polygon data provided by the host 12 and stored in an associated dedicated memory 32, and the ray intersection calculations for all of the bounding volume and polygon data are distributed over the transform processors 34. As will also be explained in more detail hereinafter, in a preferred embodiment, each transform processor is programmed to perform ray intersection calculations on every Pth dataword (where P equals the number of transform processors 34) in its associated dedicated memory, and each transform processor starts with a different dataword than other transform processors so that the transform processors collectively perform the ray intersection calculations on all of the datawords.

As also illustrated in FIG. 2, there is preferably provided a shared memory 36 communicating with each of the transform processors 34 via bus 42. Also provided is a dual port communications register 38 which communicates with each of the transform processors 34 and also with a multiplexer 40 via buses 42, 46. A read only output 44 of the communications register 38 is also supplied as an input to the multiplexer 40 for reasons that will become evident hereinafter. As shown, the multiplexer 40 is disposed between the host 12 and the shared memory 36 and communications register 38 for directing the flow of information therebetween in a manner which become evident hereinafter.

Each transform processor 34 is preferably programmed to store intermediate ray intersection calculation results in its associated dedicated memory 32, but is further programmed to store all of the ray intersection calculation results from its associated memory 32 to the shared memory 36 when its ray intersection calculations have been completed. As will become evident hereinafter, the shared memory 36 includes a completion register having a number, P, of bit locations corresponding to the number of transform processors 34. Each transform processor 34 sets a corresponding bit in the completion register when the corresponding transform processor stores its ray intersection calculation results in the shared memory 36. The transform processor 34 that sets the last bit in the completion register thereafter sets a flag in the communications register 38. The host periodically polls the communication register via multiplexer 40, bus 46 and read only output 44, and, when it detects the presence of a raised flag at the output 44, it retrieves the ray intersection calculation results from the shared memory 36 via multiplexer 40. If desired, the data from shared memory 36 may be transferred to the host computer 12 by block data transfers through the DMA circuit 30. It will be appreciated that the communications register therefore provides an indication that data in the shared memory is ready for retrieval by the host. The communications register is preferably polled by a handshaking technique wherein the communications register 38 is addressed and the flag status is provided on output 44 to the host 12 via multiplexer 40.

As will become evident from the following discussion, as each transform processor 34 completes its ray intersection calculations, it requests and is granted the shared memory 36 (i.e., to the exclusion of all other transform processors 34) to store the results of its ray intersection calculations. After all ray intersection calculation results from that transform processor have been stored in the shared memory 36, the shared memory 36 is released so that another transform processor 34 may store its results in the same fashion.

In a preferred practice of the invention, each transform processor 34 includes an information register 80 (FIG. 4) having a code that uniquely identifies it to the exclusion of the other transform processors. The starting dataword for computing ray intersection calculations is preferably determined according to the code stored in the information register 80 for that transform processor. FIG. 4 illustrates one embodiment of an information register. As shown, the information register 80 comprises a number, P, of bit locations, where P is equal to the number of transform processors 34 in the transform engine 14. An information register 80 is provided in each transform processor 34, and only a single bit is set in each information register. The particular bit that is set not only uniquely identifies that transform processor, but also indicates where this particular transform processor is located relative to the other transform processors. For example, if bit location 3 of register 80 is set in a particular transform processor 34, then this indicates that this transform engine is the third one in line.

Figure 3A:
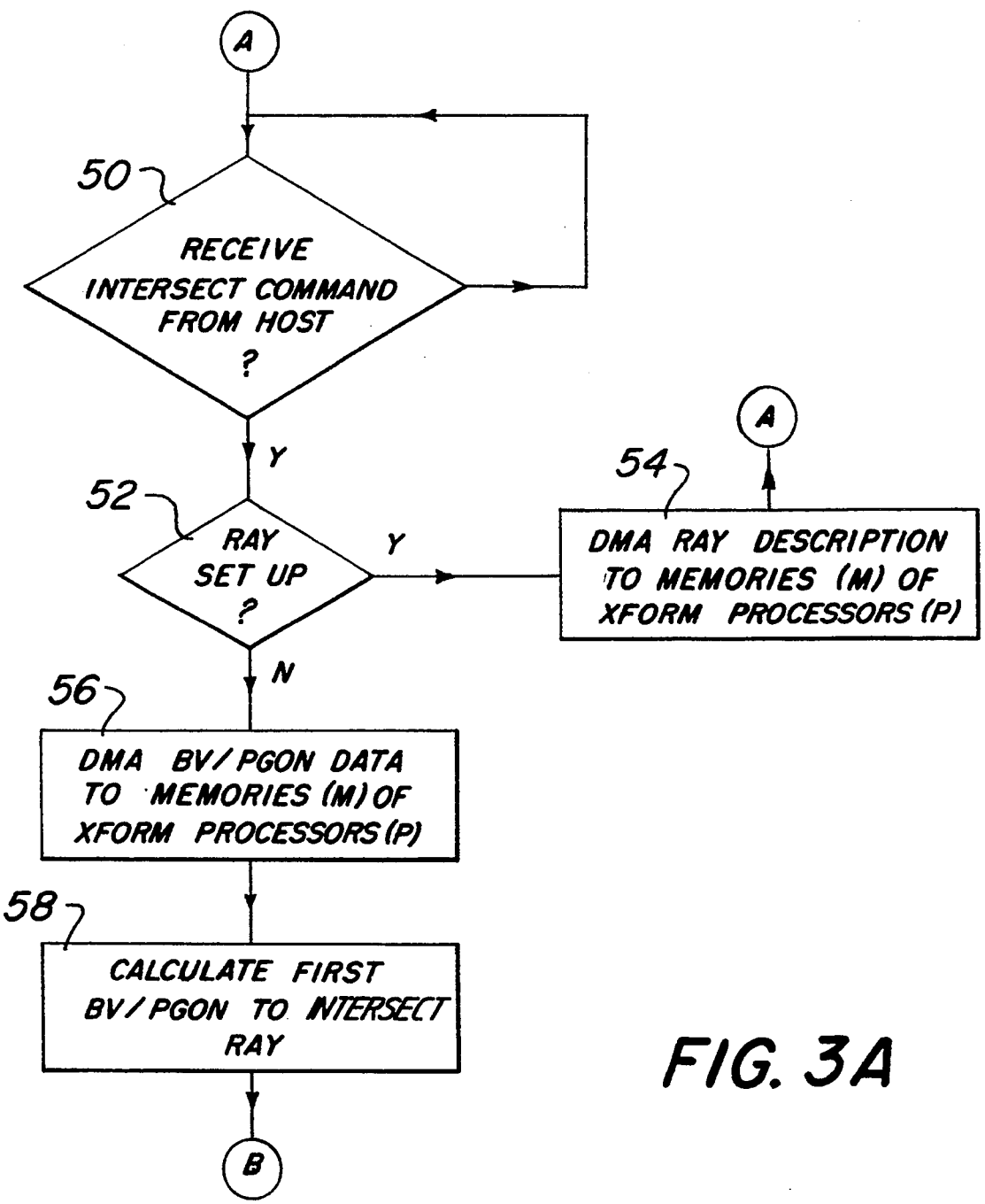
FIGS. 3A and 3B are a flowchart illustrating the method of the present invention.
Figure 3B:
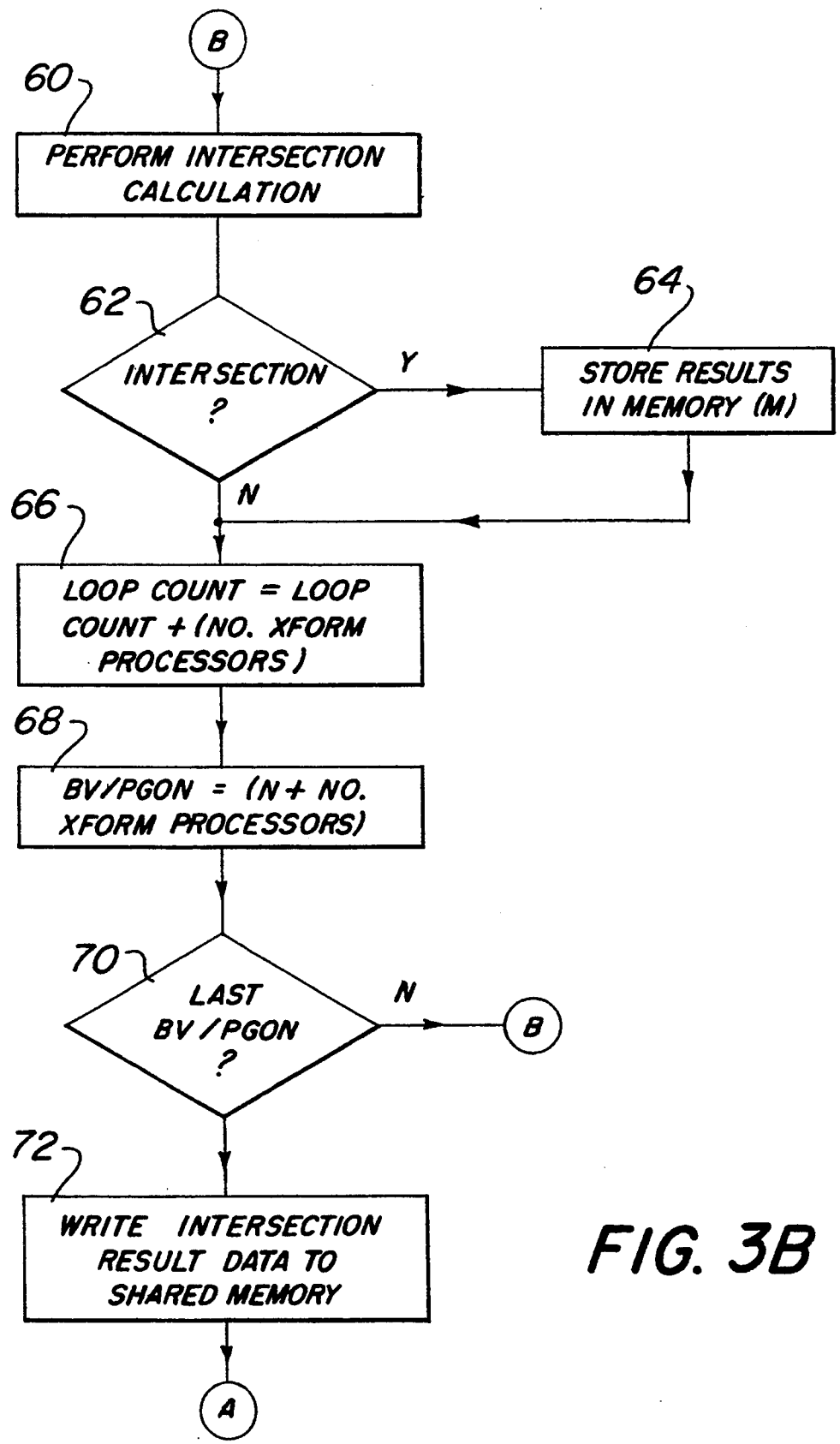

Turning now to FIGS. 3A and 3B, the method of the present invention will be described in greater detail. Except as noted, the flowchart of FIGS. 3A and 3B illustrate the operation of each of the transform processors 34. Thus, each of the transform processors 34 operate in identical fashion. Preferably, each transform engine is a programmable device such as a microcomputer and is programmed to perform the functions illustrated in FIGS. 3A and 3B.

As illustrated at block 50, each transform processor 34 waits for a ray intersection command from the host 12. In other words, after the database has been established, and the ray descriptions have been defined and the bounding volume and polygon data has been obtained by the host, ray intersections may be performed by the transform processors 34 in a well known fashion. Once a transform processor 34 receives a ray intersection command, it inquires whether the command is a ray setup command, as illustrated at 52. In other words, it inquires whether the command is one for setting up a ray for intersection with the bounding volume and polygon data. If it was a ray setup command, then the ray description data is downloaded to all of the dedicated memories 32, preferably by block data transfer via the DMA 30. The ray description data is provided to and stored in all of the dedicated memories 32.

If, at step 52, it was determined that the command was not a ray setup command, then it is assumed that the command was for the transform processors to begin performing the ray intersection calculations. To perform the ray intersection calculations, all of the bounding volume (BV) or polygon (PGON) data must also be supplied to and stored in all of the dedicated memories 32. As illustrated at step 56, this data is rapidly downloaded to all of the dedicated memories 32 from the host 12 in block data transfers via the DMA circuit 30. Once all of the bounding volume and polygon data has been downloaded to the dedicated memories 32, then the functions illustrated at steps 58 et seq. may be performed.

It will be appreciated that, at this point, the information content of each of the dedicated memories 32 will be identical. In order for the ray intersection calculations to be distributed over all of the transform processors 34, however, a method must be provided that instructs each transform processor to select different data upon which to operate and perform the ray intersection calculations. This is generally shown at step 58, but the procedure for selecting the data upon which to operate is shown in more detail in the flowchart of FIG. 5.

As shown at step 90 of FIG. 5, each transform processor employs a software pointer ("POINTER") which is initially set to point to the first bounding volume/polygon dataword in its associated dedicated memory 32. A variable, BV, is initially set to one. Also, a P bit counting register is initially set so that only its least significant bit is a 1 and all other bits therein are 0. The counting register is designated "i" in the flowcharts for simplicity. At step 92, a test is made to determine whether the contents of the register i are identical to the information register 80 (FIG. 4) for this particular transform processor. If they are not equal, then the variable BV is incremented by one, and the software pointer is incremented so that it points to the next bounding volume/polygon dataword in the associated dedicated memory 32. Next, the contents of the counting register "i" are shifted left by one bit location so that the bit that was formerly in the least significant bit location is now in the next to least significant bit location. Steps 92, 94 are repeatedly performed until a match is established between the contents of the counting register "i" and the contents of the information register 80 for each transform processor 34. Once a match is established for a particular transform processor 34, that transform processor goes on to perform steps 60 et seq. illustrated in FIG. 3B. Thus, it will be appreciated that a different starting dataword will be selected for each transform processor 34 and each transform processor 34 will begin performing ray intersection calculations on a different dataword. It will also be appreciated that the starting dataword for each transform processor 34 is determined according to the code stored in its associated information register 80.

Turning now to FIG. 3B, it will be seen that, once the starting dataword for a particular transform processor 34 has been located, ray intersection calculations upon the bounding volume or polygon indicated by that dataword may be performed. The manner of performing the ray intersection calculations does not comprise a part of the present invention inasmuch as this is well known in the art. See, for example, the above-referenced publication entitled, *An Introduction to Ray Tracing*. Once the ray intersection calculation for this particular bounding volume/polygon is completed, the transform processor 34 inquires whether this calculation resulted in an actual intersection of a ray with a bounding volume or polygon. If an intersection did occur, then the results are temporarily stored in the transform processor's associated dedicated memory 32 as shown at step 64, and step 66 is next performed. If the results of the calculation indicate that there was no intersection of a ray with the bounding volume/polygon, then no data is stored in the associated dedicated memory 32 for this particular bounding volume/polygon, and step 66 is next performed.

At step 66, a loop count is incremented by the number of transform processors in the transform engine, i.e., by P. At step 68, the bounding volume/polygon pointer (initially set at step 90 and incremented at step 94 of FIG. 5) is also incremented by the number of transform processors 34 in the system, i.e., by P. At step 70, an inquiry is made as to whether all of the bounding volume/polygon data in this transform processor's associated dedicated memory 32 has been processed. If it hasn't, steps 60–68 are repeated until all data in the dedicated memory 32 has been processed, i.e., tested for ray intersections.

Figure 7:
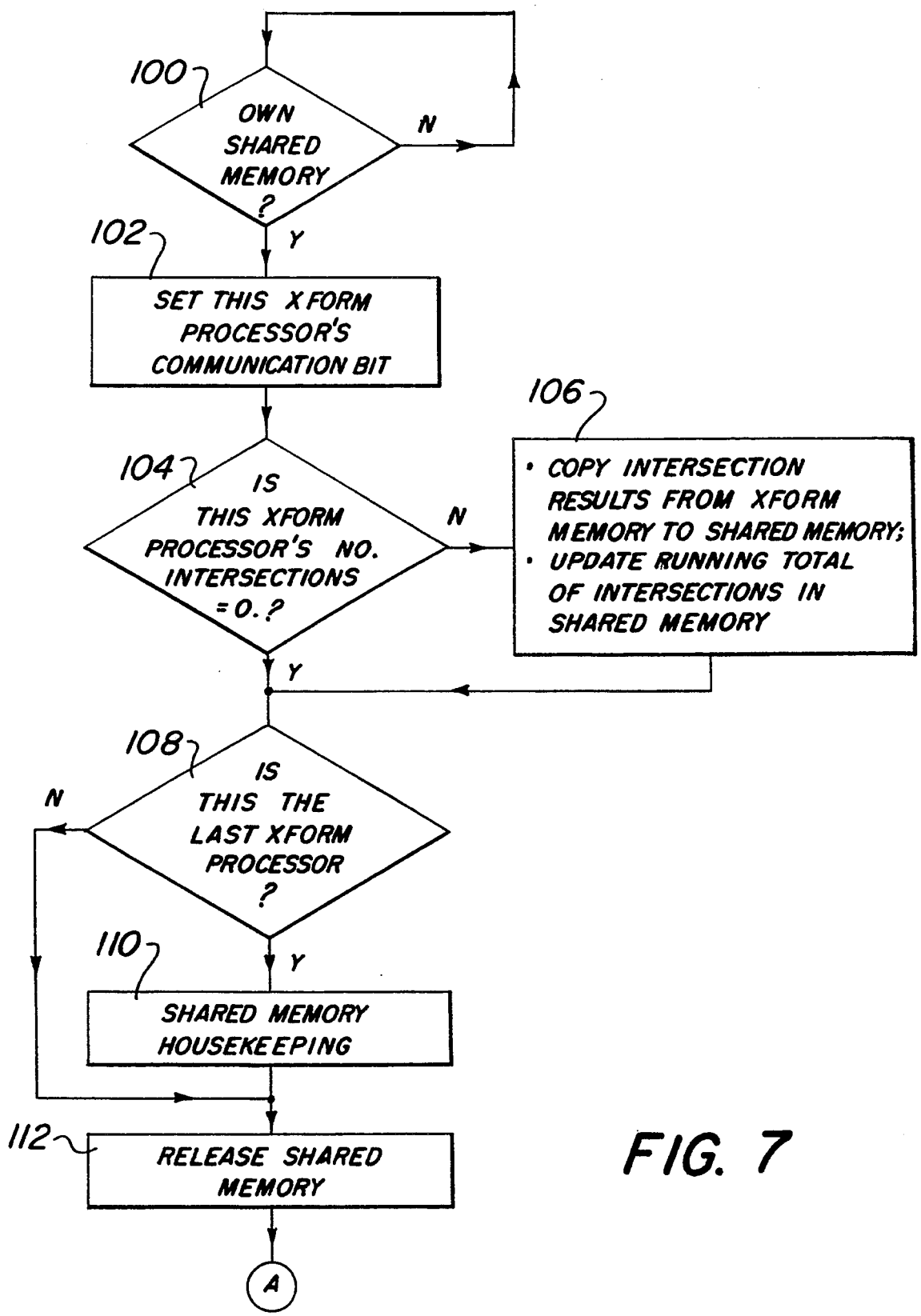
FIG. 7 is a flowchart illustrating yet further details of the method of the present invention.

It will be appreciated from the foregoing that each transform processor 34 performs ray intersection calculations on every Pth dataword in its associated dedicated memory 32, and that each transform processor 34 starts with a different dataword than other transform processors in the system so that the transform processors collectively perform the ray intersection calculations on all of the datawords that were handed down by the host computer 12. Thus, the ray intersection calculations are substantially equally distributed over all of the transform processors 34. It will also be appreciated that, as each transform processor performs steps 60–68 (FIG. 3B), intermediate ray intersection calculation results will be stored to its associated dedicated memory 32. As each transform processor 34 completes its ray intersection calculations, it writes the results (stored in associated dedicated memory 32) to the shared memory 36, as illustrated in block 72. FIG. 7 illustrates the manner in which this is performed.

Prior to discussing FIG. 7, it will be helpful to describe a preferred organization of the shared memory 36. As shown in FIG. 6, shared memory 36 is preferably organized to include the following data. First: the "completion register." As previously discussed, this is preferably a P bit register having one bit location corresponding to each of the P transform processors. As each transform processor 34 completes its ray intersection results and stores them to shared memory, it sets the corresponding bit location in the completion register. This is the same bit stored in the information register 80. As mentioned, the transform processor that sets the last bit in the completion register also sets the flag in the communications register 38 so as to signal the host 12 that the ray intersection results are ready to be retrieved from shared memory 36. Second: a dataword indicating "running total intersections." This is a running count of the number of intersections returned by each transform processor 34. Third: a dataword indicating "total words." "Total words" indicates the number of datawords stored in shared memory to be transferred to the host 12. This is provided so that the total block size of the data will be available if it is desired to retrieve the results from shared memory 38 via a DMA cycle. Fourth: a dataword indicating "total ray intersections." This indicates the total number of intersections detected by all transform processors 34. The difference between "total intersections" and "running total intersections" is that "running total intersections" is continuously updated as each transform processor stores its ray intersection calculation results to shared memory. "Total intersections" indicates the final, total number of intersections. Fifth: the actual ray intersection calculation results provided by each of the transform processors 34.

Turning now to FIG. 7, there is illustrated the routine for transferring the ray intersection calculation results from each of the dedicated memories 32 to the shared memory 36. As illustrated at 100, as each transform processor 34 completes its ray intersection calculations, it requests the shared memory 36 and then goes into a waiting loop. When the shared memory is granted to a transform processor 34 (i.e., to the exclusion of all other transform processors), that transform processor sets the respective bit in the "completion register" discussed above, as illustrated at 102. At step 104, an inquiry is made as to whether or not this transform processor detected zero intersections as the result of its ray intersection calculations. If there were actual intersections, then the steps indicated at 106 are performed. In particular, the ray intersection results are copied from the transform processor's associated dedicated memory 32 to shared memory 36, and the dataword indicative of running total intersections is updated to reflect the number of additional intersections detected by this transform processor. If, at step 104, it was determined that no intersections were detected, then no data is copied from the transform processor's associated dedicated memory 32 and the functions illustrated at 108 are performed.

At step 108, an inquiry is made as to whether all transform processors have stored their intersection results in the shared memory 36. If they haven't, control passes directly to step 112 where the shared memory is released so that the next transform processor can transfer its intersection results. On the other hand, if this is the last transform processor, as indicated by all of the bits in the completion register being set, then some shared memory housekeeping must first be performed as shown at 110. In particular, if all transform processors have now stored their intersection results in the shared memory, then the communications register flag must be raised, and the completion register zeroed out. Additionally, the "running total intersections" dataword is copied into the "total intersections" memory location in shared memory. The "total words" (total number of datawords to be transferred to the host) is then computed and stored in the "total words" location in shared memory. Lastly, the "running total intersections" dataword is cleared. The shared memory 36 is now ready to receive new data from the transform engine 14.

Figure 8A:
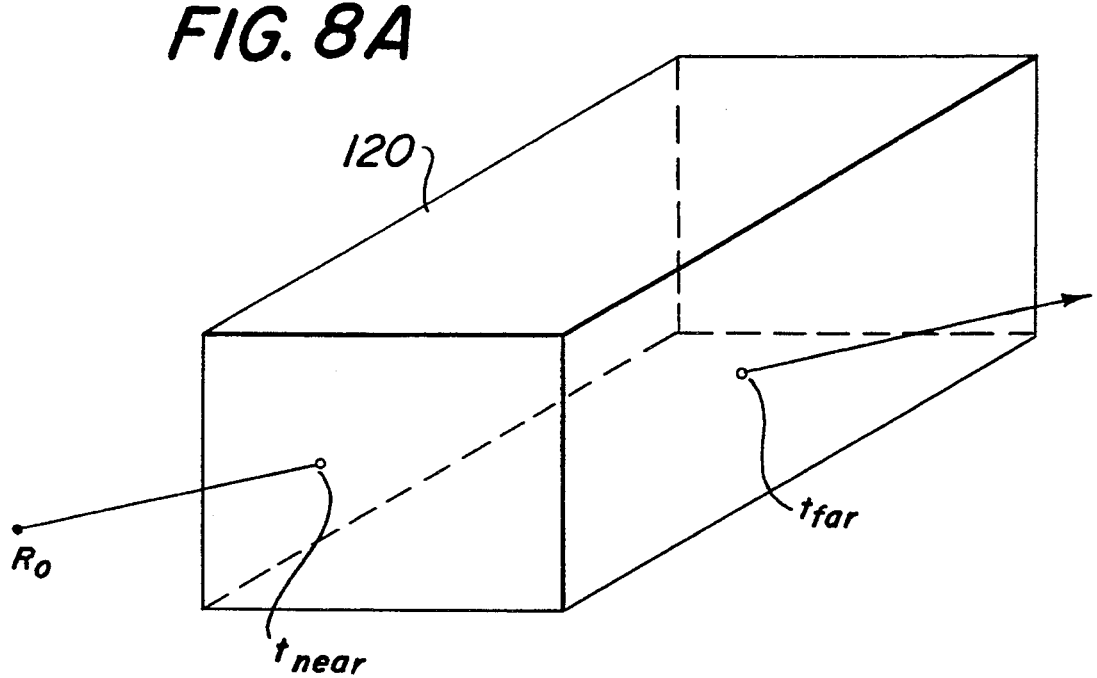
FIGS. 8A and 8B conceptually illustrate the types of data that are provided as a result of ray intersection calculations.
Figure 8B:
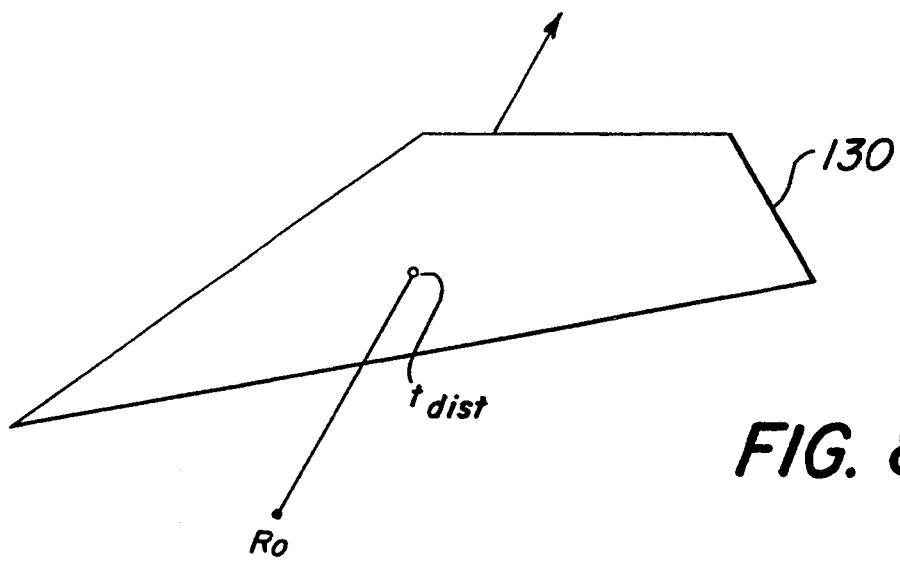

FIGS. 8A and 8B illustrate the types of data that are stored in shared memory 36 as the result of a ray intersection calculation. FIG. 8A illustrates an intersection of a ray $R_0$ with a bounding volume 120. The intersection of the ray $R_0$ with the bounding volume 120 results in two indices, $t_{near}$ and $t_{far}$, representing the parametric distance along the ray $R_0$ where it entered and exited, respectively, the bounding volume 120. FIG. 8B illustrates the intersection of a ray $R_0$ with a polygon 130. Since polygons are planar, only one value needs to be returned, i.e., the value of $t_{dist}$ representing the parametric distance along the ray $R_0$ at which it intersected the polygon 130.

The present invention vastly accelerates the ray intersection process in three dimensional computer graphics renderers. The present invention may be embodied in any specific forms without departing from the spirit or essential attributes thereof and, accordingly reference should be made to the appended claims rather than to the foregoing specification, as indicating the scope of the invention.

What is claimed:

1. Apparatus for accelerating the testing for intersections between a ray under consideration and objects in a scene to be rendered on a display device, said apparatus comprising:
   a) a host computer for storing data defining the scene, including data indicative of bounding volumes and polygons derived from the objects in the scene, and for storing data indicative of the ray under consideration, the data indicative of each bounding volume and polygon being stored as sequential datawords, each dataword representing one of said bounding volumes and polygons; and,
   b) a transform engine comprising a plurality, P, of transform processors each being programmed to test for intersections between the ray under consideration and the bounding volumes and polygons represented by every Pth datword, each transform processor starting with a different dataword than other transform processors so that collectively the transform processors perform ray intersection calculations for all of the bounding volumes and polygons.

2. Apparatus according to claim 1 further comprising a shared memory operatively coupled to communicate with both the transform engine and the host, each transform processor further being programmed to store the results of ray intersection tests performed thereby in the shared memory for retrieval by the host.

3. Apparatus according to claim 2 further comprising a communications register communicating with the transform engine and with the host for providing an indication that data in the shared memory is ready for retrieval by the host.

4. Apparatus according to claim 3 wherein the transform processors are further programmed to set a flag in the communications register when a last one of the transform processors has stored the results of ray intersection tests in the shared memory, and the host polls the communications register and retrieves data stored in the shared memory after the flag has been set.

5. Apparatus according to claim 3 further comprising a multiplexer disposed between (i) the host and (ii) the communications register and shared memory for directing data flow between the host, shared memory and communications register.

6. Apparatus according to claim 2 wherein each transform processor communicates with the shared memory to the exclusion of all other transform processors to store results of ray intersection tests from the transform processor after the transform processor has completed ray intersection tests for each of the selected bounding volume and polygon data.

7. Apparatus according to claim 6 wherein the shared memory includes a P bit completion register having a bit location corresponding to each transform processor, and each transform processor sets a corresponding bit in the completion register when the corresponding transform processor stores its ray intersection test results in the shared memory.

8. Apparatus according to claim 1 further comprising a plurality of dedicated memories, one associated with and operatively coupled to each transform processor, the data indicative of said bounding volumes and polygons being stored as sequential datawords in each of said dedicated memories, each transform processor performing ray intersection calculations on every Pth dataword in its associated dedicated memory.

9. Apparatus according to claim 8 further comprising a DMA circuit disposed between the host and the transform engine for rapidly providing the bounding volume and polygon data from the host for storage in the associated dedicated memories in DMA cycles.

10. Apparatus according to claim 1 wherein each transform processor includes an information register having a code for uniquely identifying the transform processor to the exclusion of other transform processors, and the starting dataword for each transform processor is determined according to the code stored in its information register.

11. Computer graphics apparatus for accelerating the testing for intersections between a ray under consideration and objects in a scene to be rendered on a display device, said apparatus comprising:
   a) a host computer for storing data defining the scene, including data indicative of bounding volumes and polygons derived from the objects in the scene, and for storing data indicative of the ray under consideration;
   b) a transform engine comprising a plurality, P, of transform processors, and an equal plurality of dedicated memories, one associated with and operatively coupled to each transform processor, each dedicated memory receiving from the host the data indicative of the ray under consideration and the data indicative of each bounding volume and polygon, the data indicative of each bounding volume and polygon being stored as sequential datawords in each dedicated memory;
   c) a block data transfer path disposed between the host and the transform engine for rapidly transferring the ray data and the bounding volume and polygon data from the host to the dedicated memories; and,
   d) a shared memory operatively coupled to communicate with both the transform engine and the host;
   each transform processor being programmed to test for intersections between the ray under consideration and the bounding volumes and polygons represented by every Pth dataword in its associated dedicated memory, each transform processor starting with a different dataword than other transform processors so that collectively the transform processors perform ray intersection calculations for all of the bounding volumes and polygons, each transform processor being further programmed to store the results of ray intersection tests performed thereby in the shared memory for retrieval by the host.

12. Apparatus according to claim 11 further comprising a communications register communicating with the transform engine and with the host for providing an indication that data in the shared memory is ready for retrieval by the host, and wherein a flag is set in the communications register when the transform engine has completed all ray intersection tests and stored all results in the shared memory, and the host polls the communications register and retrieves data stored in the shared memory after the flag has been set.

13. Apparatus according to claim 12 wherein the shared memory includes a P bit completion register having a bit location corresponding to each transform processor, and each transform processor sets a corresponding bit in the completion register when the corresponding transform processor stores its ray intersection test results in the shared memory, and the communications register flag is set when all bits in the completion register have been set.

14. Apparatus according to claim 12 further comprising a multiplexer disposed between the (i) host and (ii) the communications register and shared memory for directing data flow therebetween.

15. Apparatus according to claim 11 wherein each transform processor includes an information register having a code for uniquely identifying the transform processor to the exclusion of other transform processors, the starting dataword for each transform processor being determined according to the code stored in its information register.

16. Apparatus according to claim 11 wherein the block data transfer path comprises a DMA circuit.

17. Apparatus for use in a computer graphics system having a display device for rendering global illumination of a scene, said apparatus for accelerating the testing for intersections between a ray under consideration and objects in the scene, said apparatus comprising:

a) a host computer for storing data defining the scene, including data indicative of bounding volumes and polygons derived from the objects in the scene, and for storing data indicative of the ray under consideration;

b) a transform engine operatively coupled to communicate with the host and comprising a plurality, P, of transform processors and a plurality of dedicated memories, one associated with each transform processor, the data indicative of the ray under consideration and of the bounding volumes and polygons being provided by the host and stored in each of the associated dedicated memories, each transform processor being programmed to receive the data indicative of the ray under consideration and the data indicative of the bounding volumes and polygons from the dedicated memory associated therewith and to test, based on said data, for intersections between the ray under consideration and each of a selected set of bounding volumes and polygons, the selected set of bounding volumes and polygons being different for each processor such that the ray intersection tests for all of the bounding volumes and polygons are distributed over the p transform processors, each transform processor setting a bit in a completion register after completing the ray intersection tests on its selected set;

c) a block data transfer path between the host and the transform engine for rapidly transferring the ray data and bounding volume and polygon data from the host to the dedicated memories;

d) a shared memory operatively coupled to communicate with the host and the transform engine and receiving the results of the ray intersection tests from each transform processor for retrieval by the host; and, e) a communications register for signalling the host that data stored in the shared memory is ready for retrieval by the host after all transform processors have set a bit in the completion register.

18. Apparatus according to claim 17 wherein each transform processor has a unique code and the bounding volume and polygon data are stored as sequential datawords in each dedicated memory, each transform processor being programmed to perform ray intersection tests on every Pth dataword in its associated dedicated memory, each transform processor starting with a different dataword than other transform processors, the starting dataword for each transform processor being determined according to the code.

19. Method for accelerating the testing for intersections between a ray under consideration and objects in a scene to be rendered on a display device, said method comprising:

a) transmitting data indicative of the ray under consideration, and data indicative of bounding volumes and polygons that define the objects in the scene, from a host to a transform engine comprising a plurality P of transform processors, the polygon and bounding volume data transmitted from the host being stored as sequential datawords wherein each dataword represents either one of the bounding volumes or one of the polygons; and b) distributing tests for intersection between the ray under consideration and said bounding volumes and polygons over the P transform processors such that each processor performs ray intersection tests upon the bounding volumes and polygons represented by every Pth dataword and starts with a different dataword than other transform processors so that, collectively, the transform processors perform ray intersection tests on all of the bounding volumes and polygons.

20. Method according to claim 19 further comprising the step of transmitting the ray intersection test results back to the host for global rendering of the scene.

21. Method according to claim 19 wherein the data is transmitted from the host to the transform engine by a block data transfer.

22. Method according to claim 21 wherein the block data transfer is a DMA cycle.

23. In a computer graphics system for rendering a scene of objects according to a technique wherein rays are intersected with bounding volumes and polygons derived from the objects to determine global illumination of the scene, a method comprising the steps of:

a) storing graphics data, including bounding volume and polygon data, in a host;

b) transmitting, via block data transfers, the bounding volume and polygon data from the host to a transform engine of a type comprising a plurality P of transform processors and associated dedicated memories and storing the data as datawords in sequential locations of the dedicated memories;

c) distributing ray intersection calculations to be performed on the bounding volume and polygon data over the P transform processors by performing ray intersection calculations on every Pth dataword in each associated dedicated memory with each transform processor starting with a different dataword than other transform processors;

d) storing the results of the ray intersection calculations in a shared memory; and, e) transmitting the ray intersection results stored in shared memory to the host for global rendering after a last of the transform processors has completed performing ray intersection calculations.

24. Method according to claim 23 wherein the block data transfers are DMA cycles.

25. Method according to claim 23 further comprising the step of assigning a unique code to each transform processor and the starting dataword of each transform processor is determined according to the code.

* * * * *